(12) United States Patent
Shamie et al.

(10) Patent No.: US 7,874,953 B2
(45) Date of Patent: Jan. 25, 2011

(54) STATOR TORQUE TRANSMISSION ASSEMBLY

(75) Inventors: Christopher Shamie, Wadsworth, OH (US); Jeffrey Hemphill, Copley, OH (US)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 667 days.

(21) Appl. No.: 11/799,679

(22) Filed: May 2, 2007

(65) Prior Publication Data

US 2007/0259754 A1   Nov. 8, 2007

Related U.S. Application Data

(60) Provisional application No. 60/797,474, filed on May 4, 2006.

(51) Int. Cl.
*F16H 47/08* (2006.01)
(52) U.S. Cl. .............................. 475/35; 475/36; 475/44
(58) Field of Classification Search .................. 475/35, 475/36, 44–46; 192/3.52
See application file for complete search history.

(56) References Cited

U.S. PATENT DOCUMENTS

| | | | | |
|---|---|---|---|---|
| 2,890,600 A | * | 6/1959 | Smirl et al. .................... | 475/45 |
| 3,296,891 A | * | 1/1967 | Tuck ............................. | 475/36 |
| 4,724,720 A | * | 2/1988 | Ohkubo ........................ | 475/41 |
| 4,819,510 A | * | 4/1989 | Murakami .................... | 475/46 |
| 4,869,128 A | * | 9/1989 | Ohkubo ........................ | 475/41 |
| 5,106,352 A | | 4/1992 | Lepelletier | |
| 5,370,589 A | | 12/1994 | Lepelletier | |
| 5,857,934 A | * | 1/1999 | Ohkubo ........................ | 475/44 |

* cited by examiner

*Primary Examiner*—Tisha D Lewis
(74) *Attorney, Agent, or Firm*—Simpson & Simpson, PLLC

(57) ABSTRACT

A stator torque transmitting assembly for a vehicle including a stator shaft connected to a stator in a torque converter for the vehicle and arranged to transmit torque from the stator during a torque conversion mode for the torque converter. In some aspects, the assembly includes a first planetary gear set with a first sun gear, a first planetary carrier, and a first ring gear. The first sun gear is rotationally connected to the stator shaft and the first carrier is grounded. A first transmission input shaft is rotationally connected to the first ring gear and to a second carrier in a second planetary gear set in a transmission in the vehicle. A second transmission input shaft, rotationally connected to a turbine in the torque converter, is rotationally connected to a second ring gear in the second planetary gear set.

3 Claims, 7 Drawing Sheets

STATOR TORQUE TRANSMISSION ASSEMBLY

CROSS-REFERENCE TO RELATED APPLICATIONS

This patent application claims the benefit under 35 U.S.C. §119(e) of U.S. Provisional Application No. 60/797,474, filed May 4, 2006, which application is incorporated herein by reference.

FIELD OF THE INVENTION

The present invention relates generally to a torque converter, more particularly, to a torque converter stator, and, more specifically, to a torque converter stator engaged with an assembly capable of transmitting torque from the stator.

BACKGROUND

Hydraulic torque converters, devices used to change the ratio of torque to speed between the input and output shafts of the converter, revolutionized the automotive and marine propulsion industries by providing hydraulic means to transfer energy from an engine to a drive mechanism, e.g., drive shaft or automatic transmission, while smoothing out engine power pulses. A torque converter includes three primary components: an impeller, sometimes referred to as a pump, directly connected to the engine's crankshaft; a turbine, similar in structure to the impeller, however the turbine is connected to the input shaft of the transmission; and, a stator, located between the impeller and turbine, which redirects the flow of hydraulic fluid exiting from the turbine prior to reentry into the pump, thereby providing additional rotational force to the pump. This additional rotational force results in torque multiplication. Thus, for example, when the impeller speed is high and the turbine speed is low, torque may be multiplied by a 2:1 or higher ratio, whereas when the impeller and turbine speeds are approximately the same, torque can be transferred at about a 1:1 ratio.

Conventional torque converters include two ports, or paths, available to input power to or extract power from the torque converters. Normally power is input from an engine's crankshaft, through a flexplate, and into the torque converter pump weldment. Power is extracted from the torque converter via the turbine, and is subsequently sent through the transmission input shaft, thereby driving the transmission.

A separate shaft emanating from the transmission, the stator shaft, enters the torque converter, however power is not transmitted through this path as the shaft is stationary. Often torque converters include a one-way clutch between the stator and the stationary shaft which permits the stator to rotate in response to changing fluid forces resulting from increased turbine speed, i.e., as the turbine speed increases in response to increased pump speed. Thus, when the pump rotates more quickly than the turbine, the stator remains stationary. While contrarily, as the turbine rotation speed approaches the speed of the pump, the stator begins to rotate due to increased fluid forces. When the turbine rotates at substantially the same speed as the pump, the stator freewheels, and as described supra, torque is transmitted at approximately a 1:1 ratio between the engine and the transmission. Accordingly, throughout the range where the rotation of the turbine is insufficient to drive the rotation of the stator, energy is lost which could be recovered provided the torque converter and transmission included means to transfer energy from the stator to the transmission.

FIG. 1 shows a lever diagram depicting the energy paths from an input shaft through a prior art transmission, while FIG. 2 depicts a cross sectional view of a torque converter and a prior art transmission arranged according to FIG. 1. One of ordinary skill in the art will recognize that lever diagrams are a common means of describing the interactions within planetary gear sets. Each lever includes one point where power is received, one point where power is transmitted, and a fulcrum point. In some embodiments, a fulcrum is disposed between the locations where power is received and transmitted, while in other embodiments, a fulcrum is located at an end of a lever and the locations of power receipt and transmission are along the length of the lever. The direction of lever movement, i.e., left to right and right to left when viewing FIG. 1, determines the direction of gear rotation. Each lever consists of two arms, i.e., the distance between the fulcrum point and location of power receipt and the distance between the fulcrum point and location of power transmission. The ratio between the two lever arms diagrammatically represents the gear ratio.

FIGS. 1 and 2 represent the teaching disclosed in U.S. Pat. No. 5,106,352, which teaching is incorporated herein by reference. It is well known in the art how to efficiently obtain six forward gears and one reverse gear from three epicyclic gear sets, three clutches and two braking devices. Transmission 10 broadly includes epicyclic gear sets 12, 14 and 16 and further includes clutches 18, 20 and 22, as well as braking clutches 24 and 26. Epicyclic gear set 12 comprises sun gear 28, planet gear carrier 30 and ring gear 32, epicyclic gear set 14 comprises sun gear 34, planet gear carrier 36 and ring gear 38, and epicyclic gear set 16 comprises sun gear 40, planet gear carrier 42 and ring gear 44. Transmission 10 receives power through input shaft 46 and transmits power through output shaft 48. In order to obtain six forward gears and one reverse gear, clutches 18, 20 and 22 and braking clutches 24 and 26 are configured in various combinations according to Table 1 below. An 'X' denotes an engaged clutch/braking clutch and a blank indicates a disengaged clutch/braking clutch.

TABLE 1

| Gear | Clutch 18 | Clutch 20 | Clutch 22 | Braking Clutch 24 | Braking Clutch 26 |
|---|---|---|---|---|---|
| Forward 1 | X | | | | X |
| Forward 2 | X | | | X | |
| Forward 3 | X | X | | | |
| Forward 4 | X | | X | | |
| Forward 5 | | X | X | | |
| Forward 6 | | | X | X | |
| Reverse | | X | | | X |

FIG. 2 more fully describes the coupling of torque converter 50 to transmission 10. A rotary drive unit (not shown), e.g., a vehicle engine, is fixedly secured to drive plate 52 via studs 54. Drive plate 52 is secured to housing shell 56 of torque converter 50 via rivets 58, thereby enabling the transfer of power from the rotary drive unit to torque converter 50. Power is transferred within torque converter 50 by fluid. As torque converter 50 rotates, pump 60, fixedly connected to housing shell 56, transmits fluid to turbine 62. Upon exiting turbine 62, the fluid passes through stator 64 which redirects the flow of the fluid prior to reentry into pump 60. Turbine 62 is secured to hub 66, which in turn is rotationally engaged with input shaft 46. As described supra, input shaft 46 drives ring gear 32. Planet gear 68 is rotatably mounted to planet gear carrier 30 via shaft 70. Ring gear 32 is arranged to engage planet gear 68 and thus plant gear carrier 30. As shown in FIG. 1, power is introduced into transmission 10 through the previously described path, and subsequently, the desired gearing of transmission 10 is obtained by orienting the engagement/disengagement of clutches 18, 20 and 22 and braking clutches 24 and 26 according to Table 1.

One-way clutch 72 is operatively arranged between stator 64 and stator shaft 74. Stator shaft 74 is fixedly secured to casing segment 76, thereby precluding any movement and/or rotation of stator shaft 74. Similarly, movement of sun gear 28 is restricted by extension 78 which is integral to stator shaft 74. During periods of use when the rotational speed of turbine 62 is less than the rotational speed of pump 60, stator 64 is prevented from rotating via the interaction between one-way clutch 72 and stator shaft 74. As the ratio of rotational speeds between pump 60 and turbine 62 approaches unity, one-way clutch 72 permits stator 64 to freewheel, thus permitting it to rotate at a speed substantially similar to pump 60 and turbine 62. As described supra, energy imparted on stator 64 by the fluid is essentially lost due to the non-rotation of stator shaft 74.

As can be derived from the variety of devices and methods directed at providing means to couple a torque converter stator to a transmission, many means have been contemplated to accomplish the desired end, i.e., high efficiency coupling between an engine and a transmission, without sacrificing energy provided by the engine, and thus resulting in better fuel efficiency and performance. Heretofore, tradeoffs between efficiency of coupling and transmission design were required. Thus, there has been a longfelt need for a torque converter having a stator operatively arranged to transfer torque to the transmission, thereby recovering a larger portion of the energy produced by the engine.

BRIEF SUMMARY OF THE INVENTION

The present invention broadly includes a stator torque transmitting assembly for a vehicle including a stator shaft connected to a stator in a torque converter in the vehicle and arranged to rotate in a first rotation direction and a gear assembly rotationally connected to the stator shaft and to an epicyclic gear set in a transmission in the vehicle and arranged to transfer torque in a second rotation direction, wherein the second rotation direction is opposite the first rotation direction. In some aspects, the gear assembly is arranged to reverse a rotation of the stator shaft or is an idler gear. The stator shaft is arranged to transmit torque from the stator to the idler gear during a torque conversion mode for the torque converter. In some aspects, the idler gear includes a first planetary gear set with a first sun gear, first planetary carrier, and first ring gear. The stator shaft is rotationally connected to the first sun gear, the first planetary carrier is grounded, and the first ring gear is rotationally connected to the epicyclic gear set.

In some aspects, the epicyclic gear includes a second planetary carrier and the first ring gear is rotationally connected to the second carrier. In some aspects, the second planetary carrier and the first ring gear are integrally formed. In some aspects, the torque converter includes an output hub connected to a turbine, the vehicle includes a first transmission input shaft rotationally connected to the hub, and the epicyclic gear set includes a second sun gear and a second ring gear. The second sun gear is grounded and the first transmission input shaft is rotationally connected to the second ring gear. In some aspects, the assembly includes a second transmission input shaft rotationally connected to the gear assembly and to the epicyclic gear set. In some aspects, the stator includes a one-way clutch rotationally connected to the stator shaft.

The present invention also broadly includes a stator torque transmitting assembly for a vehicle including a stator shaft rotationally connected to a one-way clutch for a stator in a torque converter for the vehicle and arranged to transmit torque from the stator during a torque conversion mode for the torque converter and a first planetary gear set with a first sun gear, a first planetary carrier, and a first ring gear. The first sun gear is rotationally connected to the stator shaft, the first carrier is grounded, and the first ring gear is rotationally connected to a second carrier in a second planetary gear set in a transmission in the vehicle. A second ring gear in the second planetary gear set is rotationally connected to a transmission input shaft and the input shaft is rotationally connected to a turbine in the torque converter.

The present invention further broadly includes a stator for a torque converter including a rotatable stator shaft and a blade assembly connected to the stator shaft. In some aspects, the stator shaft is operatively arranged to engage a gear assembly. In some aspects, the gear assembly is operatively arranged to engage an epicyclic gear set in a transmission or the gear assembly is operatively arranged to reverse a rotation of the stator shaft.

A general object of the invention is to increase vehicle performance and/or efficiency.

Another object of the invention is to minimize energy loss within a torque converter.

Yet another object of the invention is to provide means to transmit torque from a torque converter stator to a vehicle transmission.

These and other objects, features, and advantages of the present invention will become readily apparent to one having ordinary skill in the art upon reading the detailed description of the invention in view of the drawings and appended claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention.

While the present invention is described with respect to what is presently considered to be the preferred embodiment, it is to be understood that the invention as claimed is not limited to the preferred embodiment.

Furthermore, it is understood that this invention is not limited to the particular methodology, materials and modifications described and as such may, of course, vary. It is also understood that the terminology used herein is for the purpose of describing particular embodiments only, and is not intended to limit the scope of the present invention.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 3:
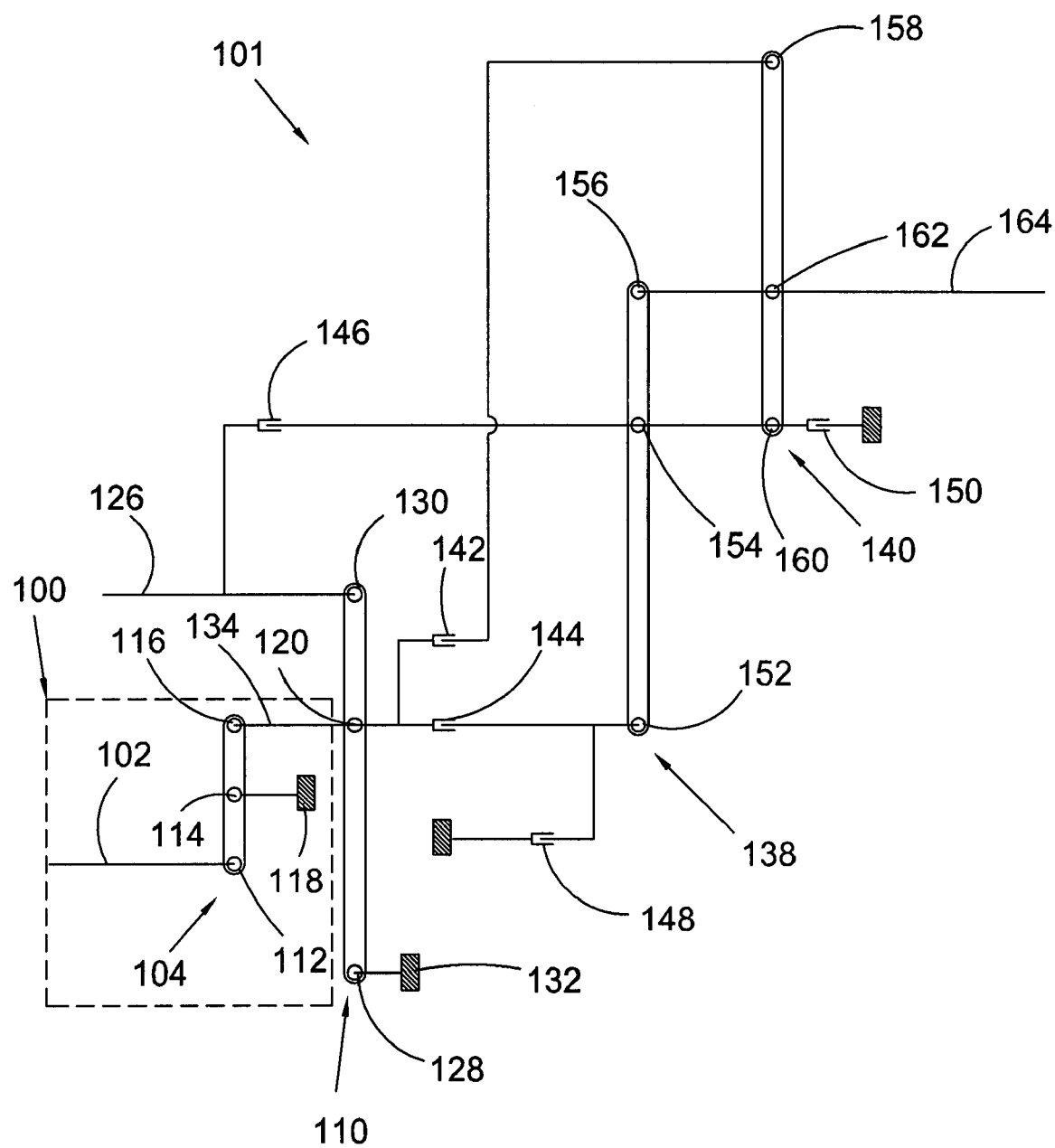
FIG. 3 is a lever diagram depicting a present invention stator torque transmitting assembly engaged with a transmission.
Figure 4:
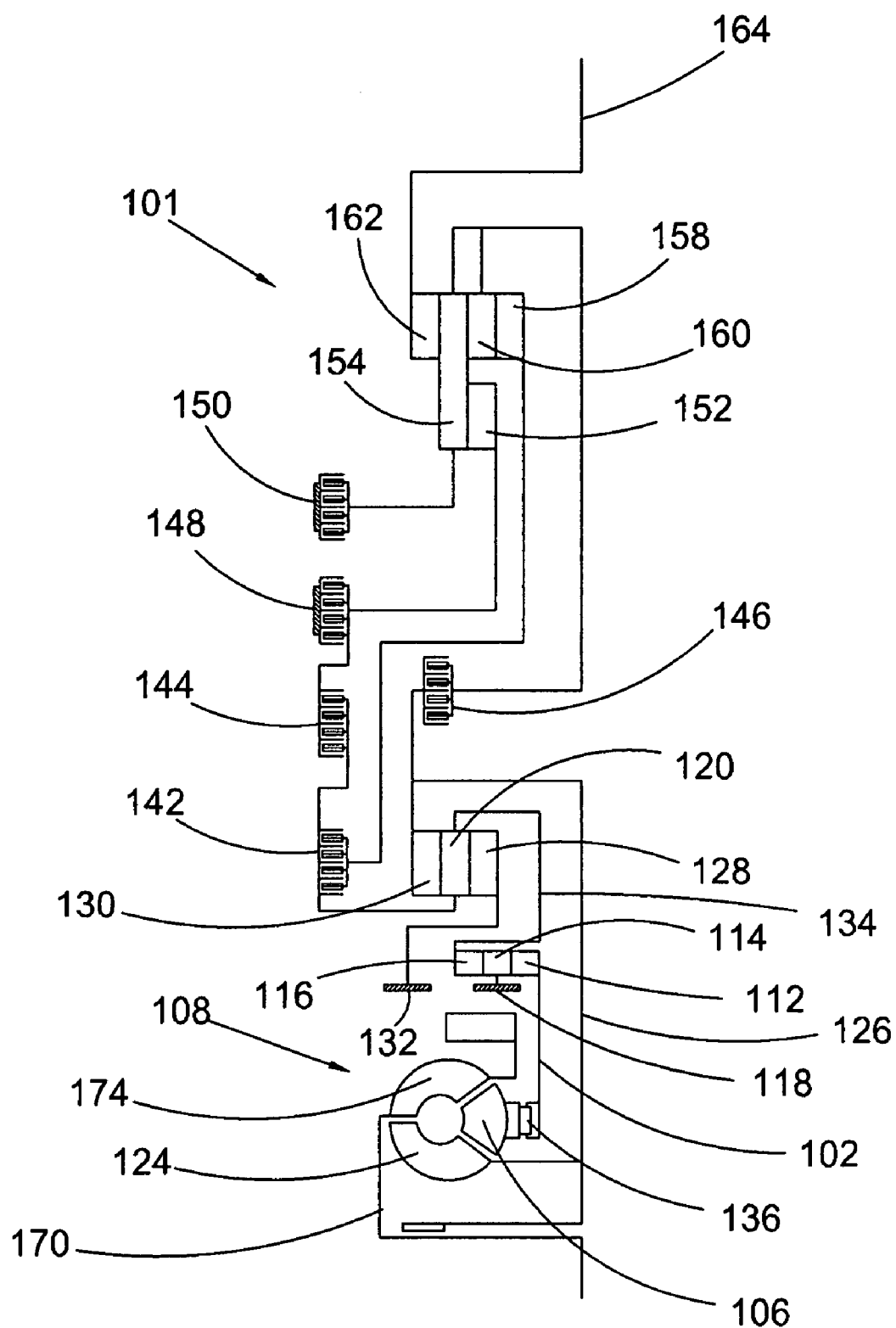
FIG. 4 is a schematic diagram of the stator torque transmitting assembly and transmission shown in FIG. 3.
Figure 5:
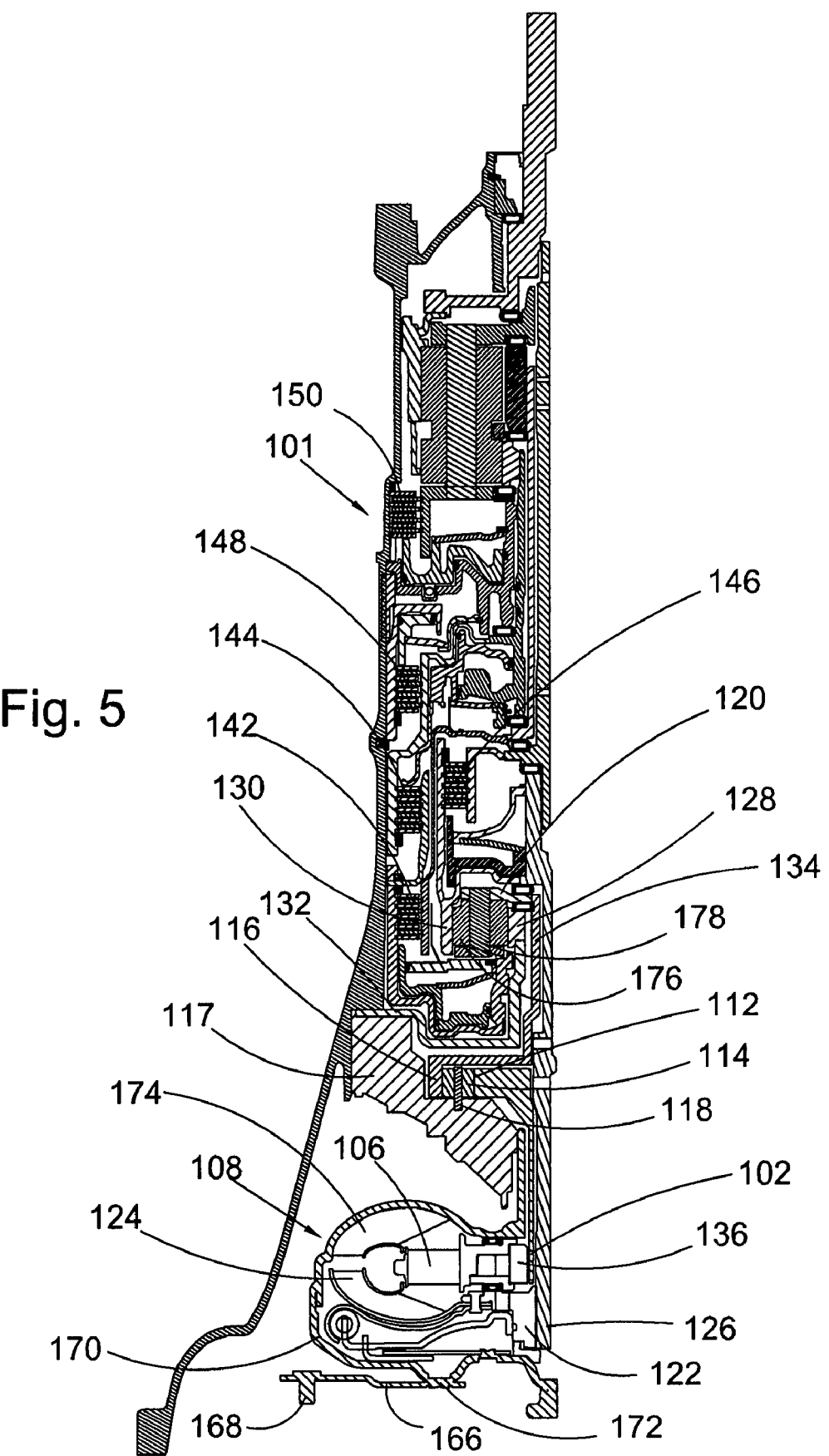
FIG. 5 is a cross sectional view of the stator torque transmitting assembly and transmission shown in FIG. 3.

Adverting now to the figures, FIG. 3 shows a lever diagram depicting the energy paths from an input shaft through a present invention transmission, FIG. 4 depicts a schematic diagram of a torque converter and a present invention transmission arranged according to FIG. 3, while FIG. 5 shows a cross sectional view of a torque converter and present invention transmission arranged according to FIG. 3.

Stator torque transmitting assembly 100 is engaged with transmission 101. Assembly 100 broadly comprises stator shaft 102 and gear assembly 104. Stator shaft 102 is rotationally connected to stator 106 in torque converter 108 in a vehicle (not shown). Gear assembly 104 is rotationally connected to stator shaft 102 and to epicyclic gear set 110 in transmission 101. By rotationally connected, or secured, we mean that gear assembly 104 and stator shaft 102 are connected such that the two components rotate together, that is, the two components are fixed with respect to rotation. Rotationally connecting two components does not necessarily limit relative movement in other directions. For example, it is possible for two components that are rotationally connected to have axial movement with respect to each other via a spline connection. However, it should be understood that rotational connection does not imply that movement in other directions is necessarily present. For example, two components that are rotationally connected can be axially fixed one to the other. The preceding explanation of rotational connection is applicable to the discussions infra. In the discussions infra, a connection is assumed to be a rotational connection unless otherwise specified.

Stator shaft 102 is arranged to transmit torque from stator 106 to gear assembly 104 during a torque, conversion mode for torque converter 108. In some aspects, gear assembly 104 may be an epicyclic gear set comprising sun gear 112, planet gear 114, and ring gear 116. In such an arrangement, stator shaft 102 is rotationally connected to sun gear 112, planet gear 114 is grounded to casing segment 117 by shaft 118, and ring gear 116 is rotationally connected to epicyclic gear set 110. Furthermore, epicyclic gear set 110 may include planet gear carrier 120 rotationally connected to ring gear 116. In some aspects, planet gear carrier 120 and ring gear 116 may be integrally formed, however, one of ordinary skill in the art will recognize that other means of securing carrier 120 and gear 116 are also possible, e.g., a splined shaft disposed between carrier 120 and gear 116, and such variations are within the spirit and scope of the claimed invention. By integrally formed, we mean that at least part of the carrier and ring gear are formed from a single common piece, that is, the carrier and ring are not separate pieces joined together directly or indirectly.

Torque converter 108 typically includes output hub 122 connected to turbine 124. The vehicle typically includes transmission input shaft 126 rotationally connected to hub 122. In some aspects, epicyclic gear set 110 includes sun gear 128 and ring gear 130. Sun gear 128 is grounded via flange 132 in transmission 101, while input shaft 126 is rotationally connected to ring gear 130.

In some aspects, input shaft 134 rotationally connects gear assembly 104 with epicyclic gear set 110. In some aspects, stator 106 includes one-way clutch 136 rotationally connected to stator shaft 102.

In some aspects, gear assembly 104 is arranged to reverse the rotation of stator shaft 102 prior to imparting the torque provided by stator shaft 102 to epicyclic gear set 110. In other aspects gear assembly 104 may be an idler gear, although one of ordinary skill in the art will recognize that other types of gears are possible and such gears are within the spirit and scope of the invention as claimed.

It should be understood that assembly 100 is not limited to use with transmission 101 and that assembly 100 can be used with transmissions having other types and numbers of components and configurations. Additionally, it should be appreciated that stator 106 coupled to rotatable stator shaft 102 may be used in other arrangements than those described above. For example, it may be desirable to extract power exclusively from the stator for certain low torque applications, e.g., to power components outside of a transmission. Hence, one of ordinary skill in the art will recognize that the use of stator 106 in combination with stator shaft 102 is not limited to the embodiments described, and such variations are within the spirit and scope of the claimed invention.

With the arrangement described supra, power is introduced into epicyclic gear set 110 of transmission 101 via two paths, i.e., input shaft 134 to planet gear carrier 120 and input shaft 126 to ring gear 130. Subsequently, the power is transferred within transmission 101 in substantially the same way as described above in view of transmission 10. Thus in this embodiment, transmission 101 further comprises epicyclic gear sets 138 and 140 and further includes clutches 142, 144 and 146, as well as braking clutches 148 and 150. Epicyclic gear set 138 comprises sun gear 152, planet gear carrier 154 and ring gear 156, and epicyclic gear set 140 comprises sun gear 158, planet gear carrier 160 and ring gear 162. Transmission 101 transmits power through output shaft 164. In order to obtain six forward gears and one reverse gear, clutches 142, 144 and 146 and braking clutches 148 and 150 are configured in various combinations according to Table 2 below. An 'X' denotes an engaged clutch/braking clutch and a blank indicates a disengaged clutch/braking clutch.

TABLE 2

| Gear | Clutch 142 | Clutch 144 | Clutch 146 | Braking Clutch 148 | Braking Clutch 150 |
|---|---|---|---|---|---|
| Forward 1 | X | | | | X |
| Forward 2 | X | | | X | |
| Forward 3 | X | X | | | |
| Forward 4 | X | | X | | |
| Forward 5 | | X | X | | |
| Forward 6 | | | X | X | |
| Reverse | | X | | | X |

FIGS. 4 and 5 more fully describe the connection between torque converter 108 and transmission 101. A rotary drive unit (not shown), e.g., a vehicle engine, is fixedly secured to drive plate 166 via studs 168. Drive plate 166 is secured to housing shell 170 of torque converter 108 via rivets 172, thereby enabling the transfer of power from the rotary drive unit to torque converter 108. Power is transferred within torque converter 108 by fluid. As torque converter 108 rotates, pump 174, fixedly connected to housing shell 170, transmits fluid to turbine 124. Upon exiting turbine 124, the fluid passes through stator 106 which redirects the flow of fluid prior to reentry into pump 174. Turbine 124 is secured to hub 122, which in turn is rotationally engaged with input shaft 126. As described supra, input shaft 126 drives ring gear 130. Planet gear 176 is rotatably mounted to planet gear carrier 120 via shaft 178. Ring gear 130 is arranged to engage planet gear 176 and thus planet gear carrier 120, thereby providing power to drive transmission 101. As shown in FIG. 3, power is introduced into transmission 101, in part, through the previously described path.

One-way clutch 136 is operatively arranged between stator 106 and input shaft 102. Input shaft 102 is rotatably mounted within transmission 101 and, in some aspects may be integral to sun gear 112. Thus, as input shaft 102 rotates, sun gear 112 also rotates. In turn, the rotation of sun gear 112 causes planet gear 114 to rotate about fixed axis 118. Axis 118 is rotatably secured to casing segment 117, and as planet gear 114 rotates, ring gear 116 is caused to also rotate. Planet gear carrier 120 is rotationally connected to ring gear 116 by an input shaft, i.e., input shaft 134, which, in some aspects, may be integral to ring gear 116. Thus, planet gear carrier 120 and planet gear 176 rotate as ring gear 116 rotates. One of ordinary skill will recognize that although input shaft 134 is integral to ring gear 116, other arrangements are also possible, e.g., a spline connection between ring gear 116 and input shaft 134, and such arrangements are within the spirit and scope of the claims. As shown in the figures, planet gear carrier 120 may provide additional power to transmission 101 depending upon the configuration of clutches 142, 144, 146 and braking clutches 148 and 150.

Figure 6:
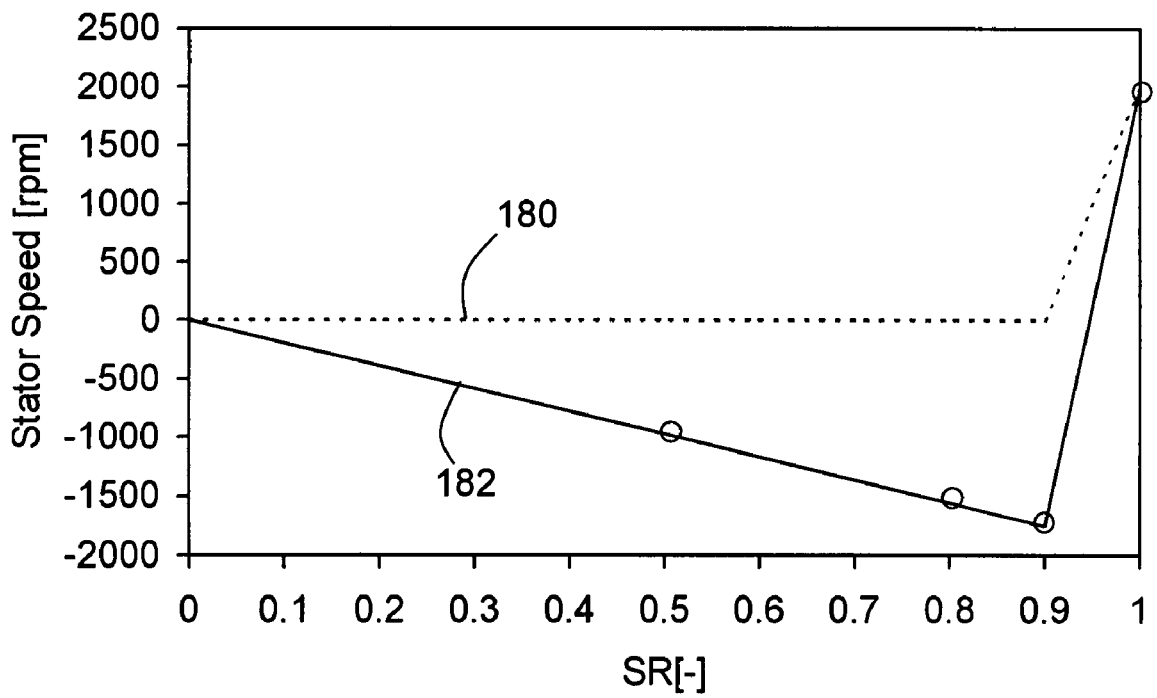
FIG. 6 is a graphical representation of stator rotational speed versus the ratio of rotational speed between turbine and pump with and without a present invention assembly.
Figure 7:
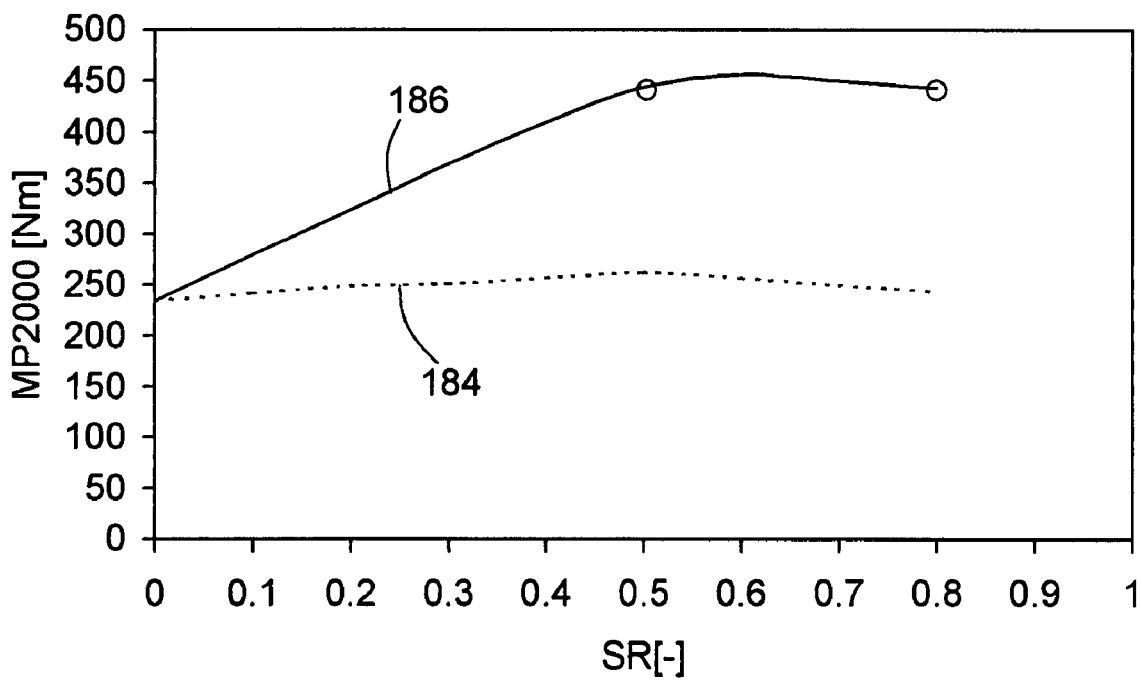
FIG. 7 is a graphical representation of pump torque capacity versus the ratio of rotational speed between turbine and pump with and without a present invention assembly; and, FIG. 8 is a graphical representation of torque converter efficiency versus the ratio of rotational speed between turbine and pump with and without a present invention assembly.
Figure 8:
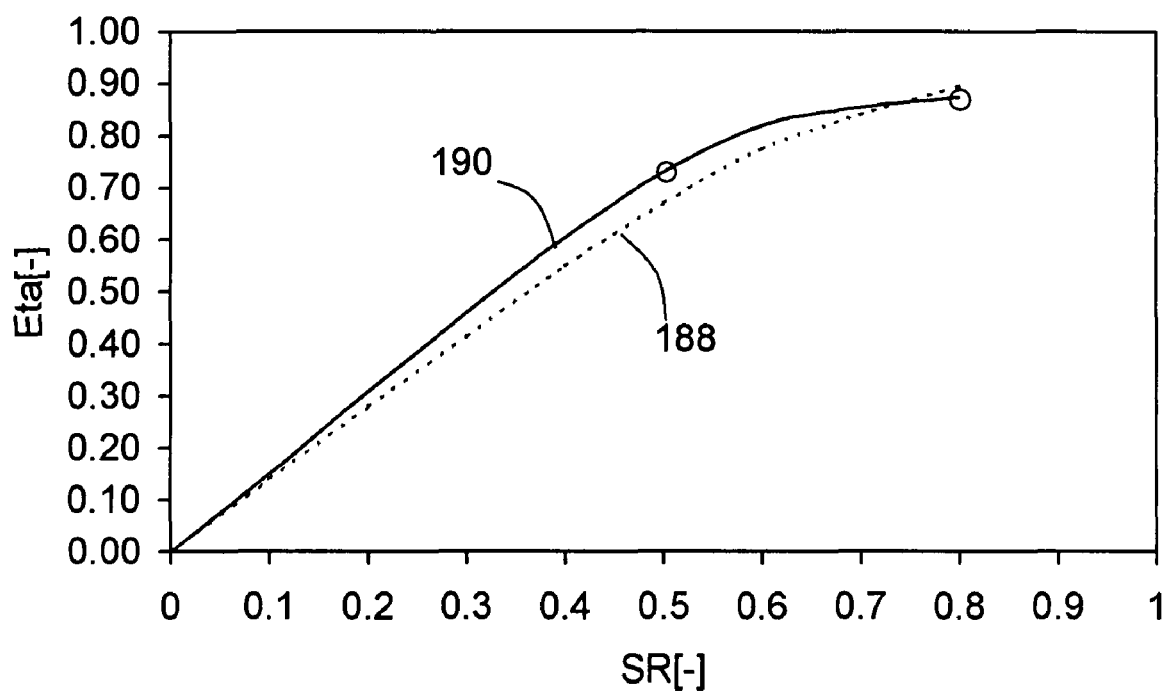

FIGS. 6, 7 and 8 depict calculated performance of torque converters 50 (see FIG. 2) and 108 (see FIG. 5) in combination with transmissions 10 and 101, respectively. Specifically, FIG. 6 shows a graphical representation of the rotational speed of stators 64 and 106 on the y-axis versus the ratio of rotational speed between turbine 62 and pump 60 and turbine 124 and pump 174, respectively, on the x-axis. FIG. 7 shows a graphical representation of the torque capacity of pumps 60 and 174 on the y-axis versus the ratio of rotational speed between turbine 62 and pump 60 and turbine 124 and pump 174, respectively, on the x-axis. FIG. 8 shows a graphical representation of the efficiency of torque converters 50 and 108 on the y-axis versus the ratio of rotational speed between turbine 62 and pump 60 and turbine 124 and pump 174, respectively, on the x-axis. On each of the graphs, the x-axis represents the ratio of rotational speed between the turbine and the pump. For example, when a vehicle is stationary, the pump rotates while the turbine is still stationary, and thus the speed ratio (SR) equals zero. Whereas, after the vehicle speed has stabilized, and the pump and the turbine are rotating at substantially the same speed, the SR approaches one.

Figure 1:
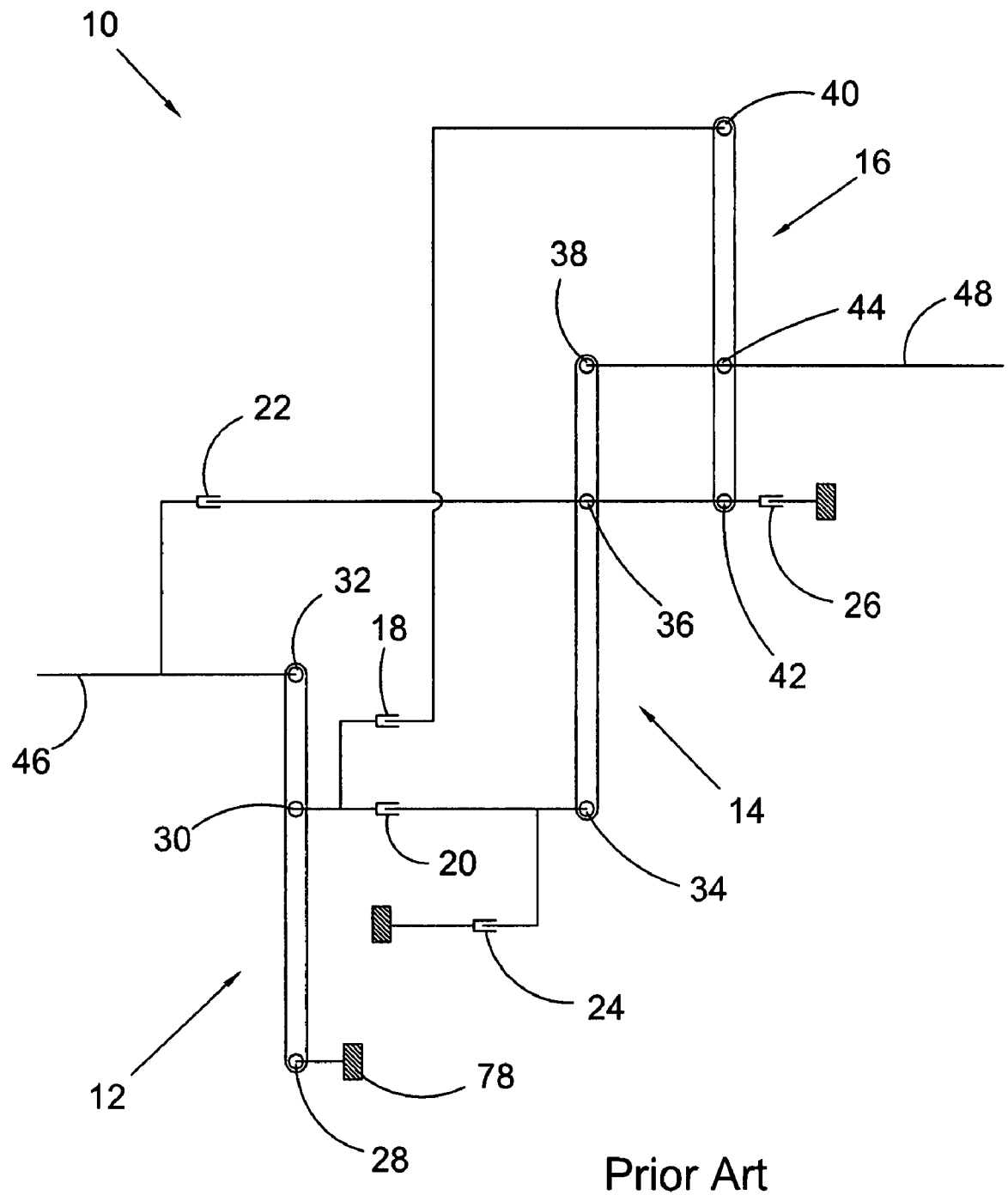
FIG. 1 is a lever diagram depicting the energy paths from an input shaft through a prior art transmission.
Figure 2:
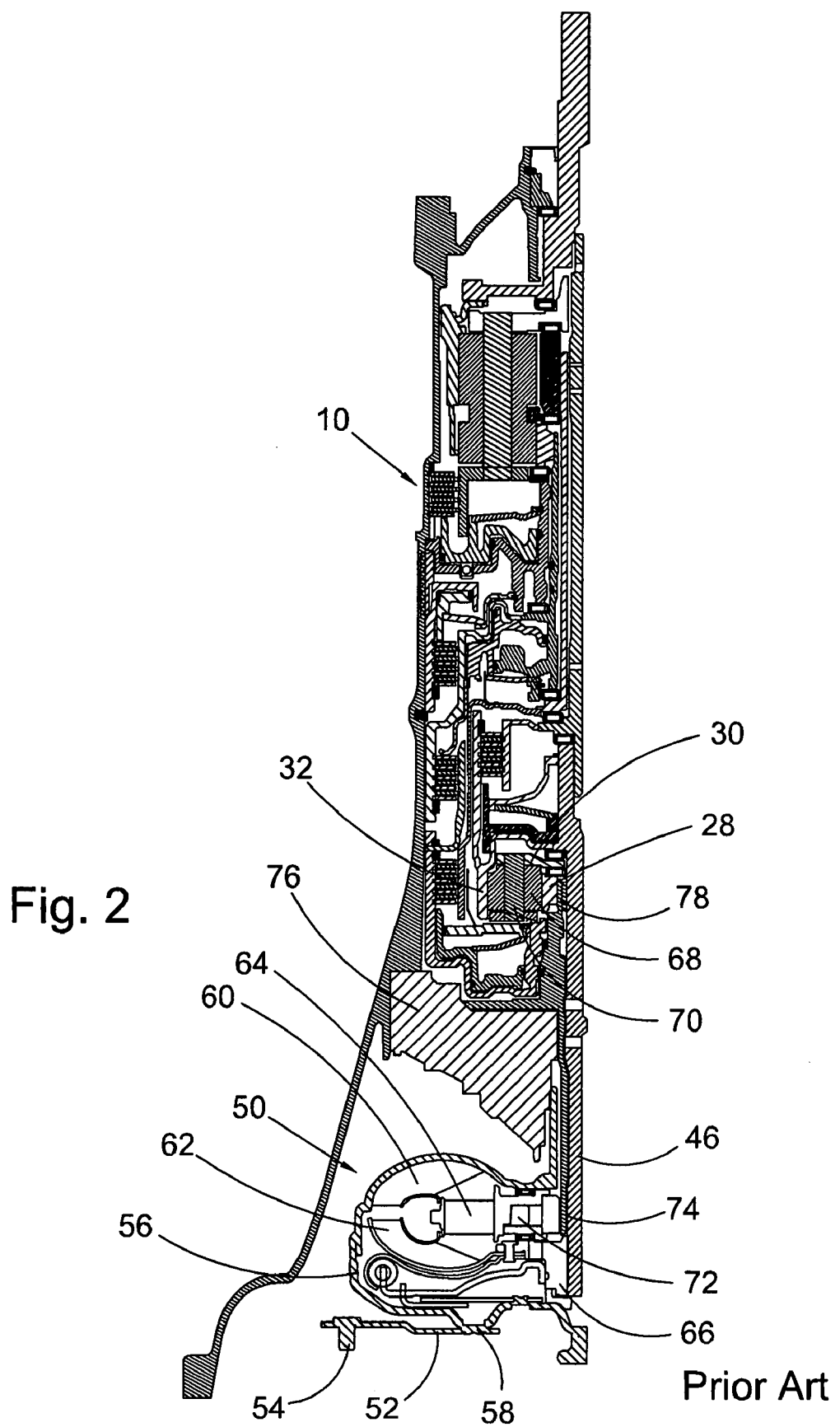
FIG. 2 is a cross sectional view of a torque converter and a prior art transmission arranged according to FIG. 1.

Returning to FIG. 6, dashed line 180 represents stator 64, configured according to FIGS. 1 and 2, i.e., a traditional torque converter, while solid line 182 represents stator 106, configured according to FIGS. 3 through 5. Dashed line 180 shows that the configuration including a fixed stator shaft prevents the stator from rotating until the SR reaches the torque converter coupling point, when the SR is approximately equal to 0.9, at which time stator 64 begins to rotate, i.e., freewheel. Contrarily, solid line 182 shows that the configuration including a rotatably mounted stator shaft permits stator 106 to rotate at a speed proportional to the opposite of the turbine speed, however stator 106 will still freewheel when the SR approaches the torque converter coupling point. At SR equals zero and SR equals one, dashed line 180 and solid line 182 are the same, and thus the stall torque ratio and torque capacity of both configurations are identical.

Returning to FIG. 7, dashed line 184 represents stator 64, configured according to FIGS. 1 and 2, i.e., a traditional torque converter, while solid line 186 represents stator 106, configured according to FIGS. 3 through 5. Dashed line 184 shows that the configuration including a fixed stator shaft maintains approximately the same pump torque capacity across the range of SR from zero through approximately 0.8. Solid line 186 shows that the configuration including a rotatably mounted stator shaft increases the pump torque capacity, over that of a traditional torque converter, across the range of SR from zero through approximately 0.8.

Returning to FIG. 8, dashed line 188 represents stator 64, configured according to FIGS. 1 and 2, i.e., a traditional torque converter, while solid line 190 represents stator 106, configured according to FIGS. 3 through 5. Solid line 190 shows that the configuration including a rotatably mounted stator shaft increases the torque converter efficiency, over that of a traditional torque converter, i.e., dashed line 188, across the range of SR from zero through approximately 0.75. In short, the overall torque converter efficiency of the instant invention is higher than that of a conventional torque converter across the middle SR range from approximately 0.2 through 0.7.

By allowing stator 106 to rotate as described, pump 174 must balance more of the torque of turbine 124, and therefore the torque capacity of pump 174 is increased. In view of the foregoing, it can be seen that under certain conditions, for example, middle speed ratios between the turbine and the pump, allowing stator 106 to extract power from torque converter 108 increases the overall torque converter efficiency from that of a traditional torque converter/transmission arrangement.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What is claimed is:

1. A stator torque transmitting assembly for a vehicle, comprising:

a torque converter comprising a turbine and a stator;

said stator comprising a one-way clutch;

a stator shaft rotationally connected to said one-way clutch and arranged to transmit torque from said stator during a torque conversion mode for said torque converter;

a first planetary gear set comprising a first sun gear, a first planetary carrier, and a first ring gear; and, a transmission comprising a transmission input shaft and a second planetary gear set, said second planetary gear set comprising a second sun gear, a second planetary carrier and a second ring gear, wherein said stator shaft is rotationally connected to only said first sun gear, said first planetary carrier is grounded, said first ring gear is rotationally connected to said second planetary carrier, said second ring gear is rotationally connected to said transmission input shaft, said transmission input shaft is rotationally connected to said turbine and said turbine is arranged to rotate and wherein said second planetary carrier and said first ring gear are integrally formed.

2. The stator torque transmitting assembly of claim 1 wherein said stator shaft is arranged to transmit torque from said stator to said first planetary gear set during said torque conversion mode for said torque converter.

3. The stator torque transmitting assembly of claim 1 wherein said torque converter further comprises an output hub connected to said turbine, said transmission input shaft is rotationally connected to said output hub, and said second sun gear is grounded.

* * * * *